United States Patent
Wang et al.

(10) Patent No.: US 11,485,845 B2
(45) Date of Patent: Nov. 1, 2022

(54) C2C3 RANDOM COPOLYMER

(71) Applicant: Borealis AG, Vienna (AT)

(72) Inventors: Jingbo Wang, Linz (AT); Markus Gahleitner, Linz (AT); Klaus Bernreitner, Linz (AT); Pauli Leskinen, Porvoo (FI); Cornelia Tranninger, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 17/595,839

(22) PCT Filed: May 20, 2020

(86) PCT No.: PCT/EP2020/064029
§ 371 (c)(1),
(2) Date: Nov. 26, 2021

(87) PCT Pub. No.: WO2020/239562
PCT Pub. Date: Dec. 3, 2020

(65) Prior Publication Data
US 2022/0145058 A1 May 12, 2022

(30) Foreign Application Priority Data
May 29, 2019 (EP) ..................................... 19177302

(51) Int. Cl.
| | | |
|---|---|---|
| *C08F 210/16* | (2006.01) | |
| *C08L 23/16* | (2006.01) | |
| *B29C 48/00* | (2019.01) | |
| *C08F 2/00* | (2006.01) | |
| *C08F 4/659* | (2006.01) | |
| *C08F 4/6592* | (2006.01) | |
| *C08F 210/02* | (2006.01) | |
| *C08F 210/06* | (2006.01) | |
| *B29L 31/00* | (2006.01) | |

(52) U.S. Cl.
CPC .......... *C08L 23/16* (2013.01); *B29C 48/0018* (2019.02); *C08F 2/001* (2013.01); *C08F 4/65912* (2013.01); *C08F 4/65927* (2013.01); *C08F 210/02* (2013.01); *C08F 210/06* (2013.01); *C08F 210/16* (2013.01); *B29L 2031/7128* (2013.01); *C08L 2201/10* (2013.01); *C08L 2203/16* (2013.01); *C08L 2314/06* (2013.01)

(58) Field of Classification Search
CPC ...... C08F 210/16; C08F 210/06; C08F 2/001; C08F 2/34; C08F 2500/12; C08F 2500/34; C08F 2500/27; C08F 2500/16; C08F 2800/20; C08L 23/16; C08L 23/14; C08L 2201/10; C08L 2203/16; C08L 2205/025
See application file for complete search history.

(56) References Cited

U.S. PATENT DOCUMENTS

| | | | |
|---|---|---|---|
| 8,703,262 B2 * | 4/2014 | Cavalieri | B32B 27/08 138/140 |
| 9,353,252 B2 * | 5/2016 | Gahleitner | C08L 23/16 |
| 9,540,506 B2 * | 1/2017 | Gahleitner | C08L 23/142 |
| 9,840,616 B2 * | 12/2017 | Gahleitner | C08K 5/14 |
| 9,932,468 B2 * | 4/2018 | Tranninger | C08J 5/18 |
| 9,969,821 B2 * | 5/2018 | Klimke | C08F 10/06 |
| 10,040,930 B2 * | 8/2018 | Gloger | C08L 23/12 |
| 10,100,186 B2 * | 10/2018 | Wang | C08L 23/142 |
| 10,323,141 B2 * | 6/2019 | Destro | C08L 23/16 |
| 10,519,306 B2 * | 12/2019 | Wang | H01B 3/441 |
| 10,920,055 B2 * | 2/2021 | Gahleitner | C08K 5/01 |
| 11,015,048 B2 * | 5/2021 | Gahleitner | C08F 210/16 |
| 11,084,920 B2 * | 8/2021 | Gahleitner | C08F 210/06 |
| 11,254,811 B2 * | 2/2022 | Aarnio-Winterhof | C08L 23/142 |
| 2011/0040041 A1 | 2/2011 | Kolb et al. | |
| 2014/0072674 A1 | 3/2014 | Holinda, Jr. et al. | |
| 2014/0155547 A1 * | 6/2014 | Gahleitner | C08F 210/06 525/240 |
| 2016/0122449 A1 * | 5/2016 | Wang | C08F 10/06 526/123.1 |
| 2017/0158788 A1 * | 6/2017 | Wang | C08L 23/142 |
| 2019/0002676 A1 | 1/2019 | Miranda et al. | |
| 2021/0362479 A1 * | 11/2021 | Gahleitner | C08F 210/06 |

FOREIGN PATENT DOCUMENTS

| | | |
|---|---|---|
| EP | 0887379 A1 | 12/1998 |
| EP | 2965908 A1 | 1/2016 |
| EP | 3064514 A1 | 9/2016 |

(Continued)

OTHER PUBLICATIONS

Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Cheng, H.N., "C NMR Analysis of Ethylene-Propylene Rubbers," Macromolecules, 1984, vol. 17, 1984, pp. 1950-1955.
The Dow Chemical Company, Affinity PL 1880G "Polyolefin Plastomer", Jan. 2005, 4 pages.
Resconi, et al., "Selectivity in Propene Polymerization with Metallocene Catalysts," Chem. Rev., 2000, vol. 100, pp. 1253-1345.
Wang, et al., "Structural Analysis of Ethylene/Propylene Copolymers Synthesized with a Constrained Geometry Catalyst," Macromolecules, 2000, vol. 33, pp. 1157-1162.
Zhou, et al., "A new decoupling method for accurate quantification of polyethylene copolymer composition and triad sequence distribution with 13C NMR," Journal of Magnetic Resonance, vol. 187, 2007, pp. 225-233.

(Continued)

*Primary Examiner* — Rip A Lee
(74) *Attorney, Agent, or Firm* — Lowenstein Sandler LLP

(57) ABSTRACT

New $C_2C_3$ random copolymers, which combine low sealing initiation temperature (SIT), high hot-tack, low C6-solubles, good optical properties and an improved stiffness/impact balance, which are particularly suited for preparing blown films. The present invention is furthermore related to the manufacture of said copolymers and to their use, as well as to the blown films comprising such $C_2C_3$ random copolymers.

13 Claims, No Drawings

(56) References Cited

FOREIGN PATENT DOCUMENTS

| | | |
|---|---|---|
| WO | 9212182 A1 | 7/1992 |
| WO | 9414856 A1 | 7/1994 |
| WO | 9512622 A1 | 5/1995 |
| WO | 9924478 A1 | 5/1999 |
| WO | 9924479 A1 | 5/1999 |
| WO | 0068315 A1 | 11/2000 |
| WO | 2002002576 A1 | 1/2002 |
| WO | 2004000899 A1 | 12/2003 |
| WO | 2004111095 A1 | 12/2004 |
| WO | 2007116034 A1 | 10/2007 |
| WO | 2011076780 A1 | 6/2011 |
| WO | 2011135004 A1 | 11/2011 |
| WO | 2012001052 A1 | 1/2012 |
| WO | 2012084961 A1 | 6/2012 |
| WO | 2013007650 A1 | 1/2013 |
| WO | 2014187686 A1 | 11/2014 |
| WO | 2015158790 A1 | 10/2015 |
| WO | 2006097497 A1 | 9/2016 |
| WO | 2016162359 A1 | 10/2016 |
| WO | 2018122134 A1 | 7/2018 |

OTHER PUBLICATIONS

Notification of Transmittal of the International Search Report and the Written Opinion of the International Searching Authority for PCT/EP2020/064029 dated Oct. 21, 2020, 17 pages.

* cited by examiner

C2C3 RANDOM COPOLYMER

CROSS REFERENCE TO RELATED APPLICATION(S)

The present application is a national stage entry under 35 U.S.C. § 371 of International Application No. PCT/EP2020/064029 filed on May 20, 2020, which claims priority to EP Application No. 19177302.7 filed on May 29, 2019, the entire contents of which are incorporated in their entirety.

FIELD OF INVENTION

The present invention is related to new $C_2C_3$ random copolymers, which combine low sealing initiation temperature (SIT), high hot-tack force (HTF), low C6-solubles, good optical properties and an improved stiffness/impact balance, which are particularly suited for preparing blown films.

The present invention is furthermore related to the manufacture of said copolymers and to their use, as well as to the blown films comprising such $C_2C_3$ random copolymers.

BACKGROUND

Polypropylenes succeed more and more to replace polyethylenes in many technical fields as quite often the new generation of polypropylenes have enhanced properties compared to conventional polyethylene materials. This applies also for the field of blown films where polypropylene take advantage of molecular engineering to overcome previous material shortcomings for blown-film production.

The blown films sector constitutes an area of ever-increasing importance in various application segments, such as industry packaging, consumer packaging, bags and sacks, lamination films, barrier films, packaging of food or medical products, agriculture films, hygienic products and products packaging.

Polypropylene is applicable in areas where sealing properties play an important role, like in the food packing industry, especially when a good combination of transparency and mechanical performance is desired. Such a combination is difficult to achieve if the material should be suitable for sealing layers of multi-layer films, which require a good balance between sealing initiation temperature (SIT) and hot tack force (HTF). A combination of lower SIT and higher hot tack force allows the converter to run the lines during the packaging step at higher speeds, but the overall performance of the film construction will only be satisfactory if the sealing layer is sufficiently flexible, tough and transparent.

To ensure fast sealing, a low SIT is of advantage. By operating at lower temperature there is the benefit that the article to be sealed is not exposed to high temperatures. There are also economical advantages, since lower temperatures are of course cheaper to generate and maintain.

There are further advantages in avoiding high sealing temperatures, especially when temperature sensitive goods are to be packed.

Furthermore, it is also desired to have a packaging material with satisfactory optical properties, such as low haze and/or high clarity.

For example, C2/C3/C4 terpolymers prepared in the presence of Ziegler-Natta catalysts are quite often used as sealing layer. However, the optical properties of such terpolymers are not always satisfying. One approach to improve the optical properties is to add nucleating agents or clarifiers. This will clearly improve the optics of the finished products, but this technology has certain limits with regard to the purity of the products. Adding additives will introduce extra chemicals, which potentially leads to conflicts for the key application area such as food or medical packaging where the purity of the product is of high importance.

In addition of course the standards issued by the food and drug administration (FDA), i.e. inter alia having low amounts of extractables, like C6-solubles (C6 FDA), should be met.

Irrespective of the polymer type, a polymer must fulfil at best all desired end properties and additionally must be easily processable, i.e. it must withstand stress. However, end properties and processing properties act often in a conflicting manner.

It frequently turns out that improvement of one of the desired properties is achieved at the expense of at least one of the other properties.

Several attempts have been made to solve the above problems.

EP 3064514 B1, for example, discloses a $C_2C_3$ random copolymer composition for heat sealing comprising three polymer fractions (A), (B) and (C) with different comonomer content, whereby the composition is obtained in the presence of a metallocene catalyst.

Claimed are $C_2C_3$ random copolymer compositions comprising polymer fractions (A), (B) and (C), whereby, fraction (A) has a C2 content (C2 A) of 0.4 to 1.5 wt %, fraction (B) has a C2 content (C2 B) of 3.0 to 10.0 wt %, and fraction (C) has a C2 content (C2 C) of 7.0 to 15.0 wt %, whereby the comonomer content of the polymer fractions increases from fraction (A) to fraction (C) according to (C2 A)<(C2 B)<(C2 C), and whereby the composition is characterized by (i) a total C2 content in the range of 3.0-7.0 wt %, (ii) a melt flow rate MFR2 (230° C.) in the range of 2.0 to 15.0 g/10 min, (iii) a melting temperature Tm of from 128° C. to 145° C., (iv) a crystallization temperature Tc of from 85° C. to 110° C. and (v) a hexane solubles content determined in accordance with FDA section 177.1520 of at most 2.0 wt %.

Such compositions have a low sealing initiation temperature (SIT) but also low hot tack force (HTF). The key drawback of the compositions of the inventive Examples is the high $MFR_2$ of around 7.0 g/10 min, so that these compositions cannot be used for blown film.

EP 2965908 B1 discloses a PP random copolymer with ethylene, wherein (a) said propylene copolymer has a C2 content in the range of 5.3 to 9.0 wt %, a melting temperature Tm in the range of 128 to 138° C., and a xylene cold soluble fraction (XCS) in the range of 9.0 to 18.0 wt %. Said propylene copolymer comprises two fractions: a first propylene copolymer fraction (R-PP1) and a second propylene copolymer fraction (R-PP2) and said first propylene copolymer fraction (R-PP1) differs from said second propylene copolymer fraction (R-PP2) in the ethylene content.

It is stated that for this invention, it is required that the comonomer content of the propylene copolymer (R-PP) is in the range of 5.3 to 8.5 wt.-%, preferably in the range of 5.5 to 8.2 wt.-%. In the Examples, the random copolymers are produced in the presence of a Ziegler-Natta catalyst.

Such compositions show already quite a good balance of SIT and HTF, but the tensile modulus determined according to ISO 527-3 at 23° C. on cast films with a thickness of 50 mm in machine direction is with ~310 MPa quite low and the hexane solubles content (C6 FDA) is with ~3.0 wt % quite high.

Therefore, there is still a need to design materials having improved sealing behaviour due to low sealing initiation temperature (SIT) and high hot tack force (HTF), and in addition having low hexane soluble fraction, good optical properties and an improved stiffness/impact balance.

SUMMARY OF THE PRESENT INVENTION

The present invention is based on the finding that the above discussed needs for heat sealing applications, i.e. simultaneously having low sealing initiation temperature (SIT), high hot tack force (HTF), low hexane soluble fraction, good optical properties and an improved stiffness/impact balance, can be achieved by a specific design of a polyolefin composition.

Thus, according to a first aspect the present invention is directed to a $C_2C_3$ random copolymer (A) consisting of
50.0 to 85.0 wt % of polymer fraction (A-1) having
(i) an ethylene content in the range of from 2.0 to less than 5.5 wt % and
(ii) a melt flow rate $MFR_2$ (230° C./2.16 kg) measured according to ISO 1133 in the range of from 0.5 to 5.0 g/10 min and 15.0 to 50.0 wt % of polymer fraction (A-2) having
(i) an ethylene content in the range of from 5.5 to 10.0 wt % and
(ii) a melt flow rate $MFR_2$ (230° C./2.16 kg) measured according to ISO 1133 in the range of from 0.1 to 3.0 g/10 min,
whereby the melt flow rate $MFR_2$ (230° C./2.16 kg) of polymer fraction (A-2) is lower than the $MFR_2$ (230° C./2.16 kg) of polymer fraction (A-1), and
whereby the $C_2C_3$ random copolymer (A) has
(a) a total ethylene content in the range of from 3.0 to 7.5 wt %;
(b) a melt flow rate $MFR_2$ (230° C./2.16 kg) measured according to ISO 1133 in the range of from 0.5 to 5.0 g/10 min and
(c) a melting temperature Tm as determined by DSC according to ISO 11357 of from 110° C. to 135° C.

Preferably, the $C_2C_3$ random copolymer (A) is obtainable, preferably obtained, in the presence of a metallocene catalyst.

According to another embodiment of the present invention, the $C_2C_3$ random copolymer (A) has an amount of hexane hot solubles (C6 solubles, FDA) measured according to FDA 177.1520 in the range of from 0.1 to less than 2.5 wt %.

The present invention is further directed to an article, comprising at least 80.0 wt % of the $C_2C_3$ random copolymer (A) as described above.

Preferably, the article is a film, more preferably a blown film.

In a further aspect the invention is therefore related to blown films, whereby the blown film is characterized by
(i) a sealing initiation temperature (SIT) (determined as described in the experimental part) in the range of from 80° C. to below 115° C.,
(ii) a hot-tack force determined (as described in the experimental part on 50 μm blown film) of above 1.5 up to 5.0 N,
(iii) a haze (determined according to ASTM D1003-00 on blown film with a thickness of 50 μm) in the range of from 0.1 to below 10.0% and
(iv) a clarity (determined according to ASTM D1003-00 on blown film with a thickness of 50 μm) of at least 80.0% up to 100.0%

The present invention is also directed to the use of the article as described above as a sealing layer in a multi-layer film.

In a further aspect, the present invention is related to the use of the monolayer blown films according to the invention for lamination or mono- or multilayer films for packaging films and medical/hygienic films.

As alternative in one further aspect the present invention is related to the use of the monolayer blown films according to the invention as sealing layer in a polypropylene multilayer film, which can be manufactured either by co-extrusion or lamination.

DETAILED DESCRIPTION OF THE PRESENT INVENTION

In the Following, the Invention is Defined in More Detail.
$C_2C_3$ random copolymer (A)

The $C_2C_3$ random copolymer (A) of the invention is a random copolymer of propylene and ethylene as comonomer.

The $C_2C_3$ random copolymer (A) is obtainable, preferably obtained, in the presence of a metallocene catalyst.

The $C_2C_3$ random copolymer (A) according to this invention is featured by a moderate to low ethylene comonomer content.

Accordingly, the $C_2C_3$ random copolymer (A) has a total ethylene content in the range of 3.0 to 7.5 wt %, preferably in the range of from 4.0 to 6.5 wt %, and more preferably in the range of from 4.5 to 6.0 wt %.

The $C_2C_3$ random copolymer (A) has a melt flow rate $MFR_2$ (230° C.) measured according to ISO 1133 in the range of from 0.5 to 5.0 g/10 min, preferably in the range of from 0.8 to 4.0 g/10 min and more preferably in the range of from 1.0 to 3.0 g/10 min.

The $C_2C_3$ random copolymer (A) furthermore has a melting temperature Tm measured via DSC according to ISO 11357 in the range of from 110° C. to 135° C., preferably in the range of from 112° C. to 130° C., and more preferably in the range of from 115° C. to 125° C.

Alternatively, the $C_2C_3$ random copolymer (A) can be defined by the xylene cold soluble (XCS) content determined at 25° C. according ISO 16152; 2005. Accordingly, the $C_2C_3$ random copolymer (A) is preferably featured by a xylene cold soluble (XCS) content of from 0.1 wt % to below 12.0 wt %, preferably in the range of from 1.0 to 10.0 wt %, like in the range from 1.5 to 8.5 wt %.

In order to facilitate processing, especially film processing, it is also desirable that the $C_2C3$ random copolymer (A) according to the present invention has a suitable crystallization temperature even in absence of any nucleating agents. Preferably, the $C_2C_3$ random copolymer (A) has a crystallization temperature Tc as determined by DSC (differential scanning calorimetry) according to ISO 11357 in the range of 70° C. to 100° C., more preferably in the range of 72° C. to 95° C., like in the range of 75° C. to 90° C.

It is also preferred that the difference between melting temperature Tm and crystallization temperature Tc, (Tm–Tc), is rather low. Said difference (Tm–Tc) shall preferably be less than 45° C., more preferably in the range of from 30° C. to 44° C., like in the range of from 32° C. to 43° C.

According to another embodiment of the present invention, the $C_2C_3$ random copolymer (A) has an amount of hexane hot solubles (C6 FDA) measured on a 100 μm thick blown film according to FDA 177.1520 in the range of from 0.1 to less than 2.5 wt %, preferably in the range of from 0.2 to 2.0 wt %, more preferably in the range of from 0.1 to 1.6 and even more preferably in the range of from 0.3 to 1.8.

The $C_2C_3$ random copolymer (A) is bimodal in view of the comonomer content and the $MFR_2$ and consists of polymer fractions (A-1) and (A-2).

Thus, the $C_2C_3$ random copolymer (A) comprises 50.0 to 85.0 wt % of polymer fraction (A-1) having (i) an ethylene content in the range of from 2.0 to less than 5.5 wt % and (ii) a melt flow rate $MFR_2$ (230° C./2.16 kg) measured according to ISO 1133 in the range of from 0.5 to 5.0 g/10 min and 15.0 to 50.0 wt % of polymer fraction (A-2) having (i) an ethylene content in the range of from 5.5 to 10.0 wt % and (ii) a melt flow rate $MFR_2$ (230° C./2.16 kg) measured according to ISO 1133 in the range of from 0.1 to 3.0 g/10 min, whereby the melt flow rate $MFR_2$ (230° C./2.16 kg) of polymer fraction (A-2) is lower than the $MFR_2$ (230° C./2.16 kg) of polymer fraction (A-1).

Preferably, the $C_2C_3$ random copolymer (A) comprises 55.0 to 82.0 wt % of polymer fraction (A-1) and 18.0 to 45.0 wt % of polymer fraction (A-2).

More preferably, the $C_2C_3$ random copolymer (A) comprises 60.0 to 80.0 wt % of polymer fraction (A-1) and 20.0 to 40.0 wt % of polymer fraction (A-2).

Polymer fraction (A-1) preferably has an ethylene content in the range of from 2.5 to 5.2 wt % and more preferably in the range of from 3.0 to 5.0 wt %.

The melt flow rate $MFR_2$ (230° C./2.16 kg) measured according to ISO 1133 of polymer fraction (A-1) is preferably in the range of from 0.8 to 4.0 g/10 min, more preferably in the range of from 1.0 to 3.0 g/10 min.

Polymer fraction (A-2) preferably has an ethylene content in the range of from 5.5 to 8.5 wt % and more preferably in the range of from 5.6 to 7.5 wt %.

The melt flow rate $MFR_2$ (230° C./2.16 kg) measured according to ISO 1133 of polymer fraction (A-2) is preferably in the range of from 0.2 to 2.5 g/10 min and more preferably in the range of from 0.3 to 2.0 g/10 min, like 0.3 to 1.8 g/10 min.

The $C_2C_3$ random copolymer (A) is therefore preferably prepared by polymerizing propylene and ethylene by a sequential polymerization process comprising at least two reactors connected in series in the presence of a metallocene catalyst.

Thus, the $C_2C_3$ random copolymer (A) is prepared in a sequential polymerization process comprising at least two polymerization reactors (R1) and (R2), whereby in the first polymerization reactor (R1) a first polymer fraction (A-1) is produced, which is subsequently transferred into the second polymerization reactor (R2). In the second polymerization reactor (R2), a second polymer fraction (A-2) is then produced in the presence of the first polymer fraction (A-1).

Polymerization processes which are suitable for producing the $C_2C_3$ random copolymer (A) generally comprise at least two polymerization stages and each stage can be carried out in solution, slurry, fluidized bed, bulk or gas phase.

The term "polymerization reactor" shall indicate that the main polymerization takes place. Thus in case the process consists of one or two polymerization reactors, this definition does not exclude the option that the overall system comprises for instance a pre-polymerization step in a pre-polymerization reactor. The term "consist of" is only a closing formulation in view of the main polymerization reactors.

The term "sequential polymerization process" indicates that the $C_2C_3$ random copolymer (A) is produced in at least two reactors connected in series. Accordingly, such a polymerization system comprises at least a first polymerization reactor (R1) and a second polymerization reactor (R2), and optionally a third polymerization reactor (R3).

The first polymerization reactor (R1) is preferably a slurry reactor and can be any continuous or simple stirred batch tank reactor or loop reactor operating in bulk or slurry. Bulk means a polymerization in a reaction medium that comprises of at least 60% (w/w) monomer.

According to the present invention, the slurry reactor is preferably a (bulk) loop reactor.

The second polymerization reactor (R2) and the optional third polymerization reactor (R3) are preferably gas phase reactors (GPRs), i.e. a first gas phase reactor (GPR1) and a second gas phase reactor (GPR2). A gas phase reactor (GPR) according to this invention is preferably a fluidized bed reactor, a fast fluidized bed reactor or a settled bed reactor or any combination thereof.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315.

A further suitable slurry-gas phase process is the Spheripol® process of Basell.

Preferably, in the instant process for producing the $C_2C_3$ random copolymer composition as defined above the conditions for the first reactor (R1), i.e. the slurry reactor (SR), like a loop reactor (LR), of step (a) may be as follows:

the temperature is within the range of 40° C. to 110° C., preferably between 60° C. and 100° C., more preferably between 65° C. and 95° C., the pressure is within the range of 20 bar to 80 bar, preferably between 40 bar to 70 bar, hydrogen can be added for controlling the molar mass in a manner known per se.

Subsequently, the reaction mixture of the first reactor (R1) is transferred to the second reactor (R2), i.e. gas phase reactor (GPR1), where the conditions are preferably as follows:

the temperature is within the range of 50° C. to 130° C., preferably between 60° C. and 100° C., the pressure is within the range of 5 bar to 50 bar, preferably between 15 bar to 35 bar, hydrogen can be added for controlling the molar mass in a manner known per se.

Preferably, the $C_2C_3$ random copolymer (A) according to this invention is produced in the presence of a metallocene catalyst.

Thus, the $C_2C_3$ random copolymer (A) is produced by a process comprising the following steps:

a) polymerizing in a first reactor (R1) propylene and ethylene, obtaining polymer fraction (A-1) of the $C_2C_3$ random copolymer (A), b) transferring said polymer fraction (A-1) and unreacted comonomers of the first reactor in a second reactor (R2), c) feeding to said second reactor (R2) propylene and ethylene, d) polymerizing in said second reactor (R2) and in the presence of said polymer fraction (A-1) propylene and ethylene obtaining polymer fraction (A-2), said polymer fraction (A-1) and said polymer fraction (A-2) form the $C_2C_3$ random copolymer (A) as defined above, whereby the polymerization takes place in the presence of a metallocene catalyst comprising (i) a complex of formula (I):

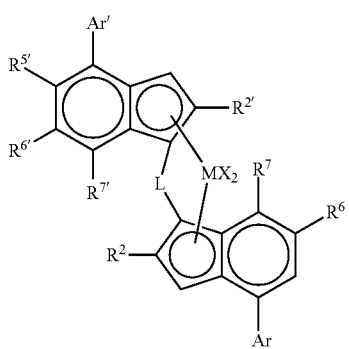

wherein M is zirconium or hafnium; each X is a sigma ligand;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;

$R^2$ and $R^{2'}$ are each independently a $C_1$-$C_{20}$-hydrocarbyl radical optionally containing one or more heteroatoms from groups 14-16 of the periodic table;

$R^5$ is a $C_{1-20}$-hydrocarbyl group containing one or more heteroatoms from groups 14-16 of the periodic table optionally substituted by one or more halo atoms;

$R^6$ and $R^{6'}$ are each independently hydrogen or a $C_{1-20}$-hydrocarbyl group optionally containing one or more heteroatoms from groups 14-16 of the periodic table; wherein $R^{6'}$ is preferably a tertiary alkyl group;

$R^7$ is hydrogen or $C_{1-20}$-hydrocarbyl group optionally containing one or more heteroatoms from groups 14-16 and $R^{7'}$ is hydrogen;

Ar and Ar' are each independently an aryl or heteroaryl group having up to 20 carbon atoms optionally substituted by one or more groups $R^1$;

each $R^1$ is a $C_{1-20}$-hydrocarbyl group or two $R^1$ groups on adjacent carbon atoms taken together can form a fused 5 or 6 membered non aromatic ring with the Ar or Ar' group, said ring being itself optionally substituted with one or more groups $R^4$; each $R^4$ is a $C_{1-20}$-hydrocarbyl group; and (ii) a cocatalyst comprising at least one or two compounds of a group 13 metal of the periodic table, e.g. Al and/or boron compound.

More preferably, a cocatalyst system comprising a boron containing cocatalyst, like borate cocatalyst and an aluminoxane cocatalyst is used.

Even more preferably, the catalyst is supported on a silica support.

Ad Catalyst:

Generally, the catalyst system used in the present invention may be prepared as described in WO 2018/122134 A1. The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The skilled person is aware of the procedures required to support a metallocene catalyst.

Especially preferably, the support is a porous material so that the complex may be loaded into the pores of the support, e.g. using a process analogous to those described in WO94/14856 (Mobil), WO95/12622 (Borealis) and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

Preferred complexes of use in the invention are of formula (II') or (II)

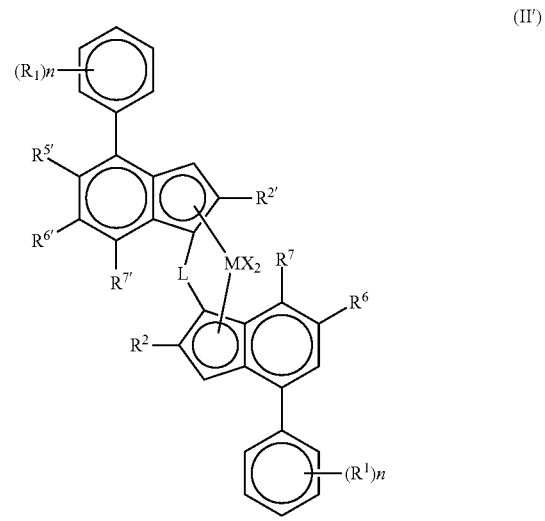

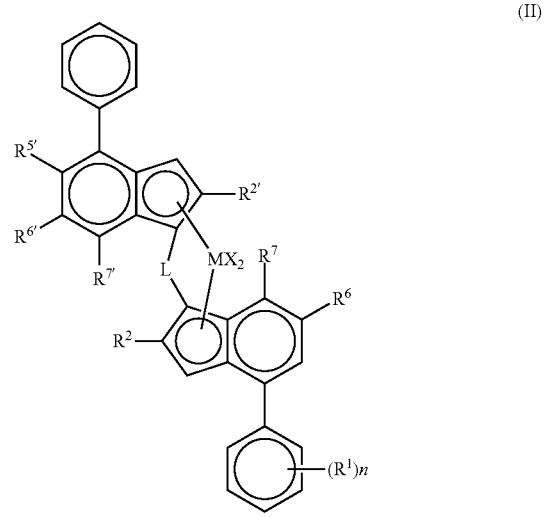

wherein M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —R'$_2$C—, —R'$_2$C—CR'$_2$—, —R'$_2$Si—, —R'$_2$Si—SiR'$_2$—, —R'$_2$Ge—, wherein each R' is independently a hydrogen atom, $C_{1-20}$-alkyl, $C_{3-10}$-cycloalkyl, tri($C_{1-20}$-alkyl)silyl, $C_{6-20}$-aryl, $C_{7-20}$-arylalkyl or $C_{7-20}$-alkylaryl;

each of $R^2$ or $R^{2'}$ is a $C_{1-10}$-alkyl group;

$R^{5'}$ is a $C_{1-10}$alkyl group or $Z'R^{3'}$ group;

$R^6$ is hydrogen or a $C_{1-10}$-alkyl group;

$R^{6'}$ is a $C_{1-10}$-alkyl group or $C_{6-10}$-aryl group; preferably a tertiary alkyl group;

$R^7$ is hydrogen, a $C_{1-6}$-alkyl group or $ZR^3$ group and $R^{7'}$ is hydrogen;

Z and Z' are independently O or S;

$R^{3'}$ is a $C_{1-10}$-alkyl group, or a $C_{6-10}$-aryl group optionally substituted by one or more halo groups;

$R^3$ is a $C_{1-10}$-alkyl group;

each n is independently 0 to 4, e.g. 0, 1 or 2;

and each $R^1$ is independently a $C_{1-20}$-hydrocarbyl group, e.g. $C_{1-10}$-alkyl group.

Further preferred complexes of use in the invention are of formula (III') or (III):

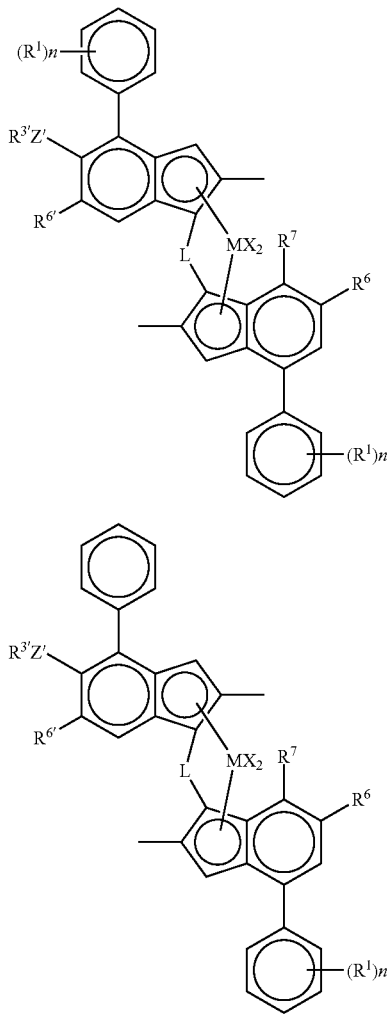

M is zirconium or hafnium;

each X is independently a hydrogen atom, a halogen atom, $C_{1-6}$-alkoxy group, $C_{1-6}$-alkyl, phenyl or benzyl group;

L is a divalent bridge selected from —R'$_2$C— or —R'$_2$Si— wherein each R' is independently a hydrogen atom, $C_{1-20}$-alkyl or $C_{3-10}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; Z is O or S;

$R^{3'}$ is a $C_{1-10}$-alkyl group, or $C_{6-10}$-aryl group optionally substituted by one or more halo groups;

n is independently 0 to 4, e.g. 0, 1 or 2; and each $R^1$ is independently a $C_{1-10}$-alkyl group. Further preferred complexes of use in the invention are of formula (IV') or (IV):

M is zirconium or hafnium;

each X is independently a hydrogen atom, a halogen atom, $C_{1-6}$alkoxy group, $C_{1-6}$-alkyl, phenyl or benzyl group;

each R' is independently a hydrogen atom, $C_{1-20}$-alkyl or $C_{3-7}$-cycloalkyl;

$R^6$ is hydrogen or a $C_{1-10}$-alkyl group;

$R^{6'}$ is a $C_{1-10}$-alkyl group or $C_{6-10}$-aryl group, preferably a tertiary alkyl group;

$R^7$ is hydrogen, $C_{1-6}$-alkyl or $OC_{1-6}$-alkyl; Z is O or S;

$R^{3'}$ is a $C_{1-10}$-alkyl group, or $C_{6-10}$-aryl group optionally substituted by one or more halo groups;

n is independently 0, 1 to 2; and each $R^1$ is independently a $C_{3-8}$-alkyl group.

Most preferably, the complex of use in the invention is of formula (V') or (V):

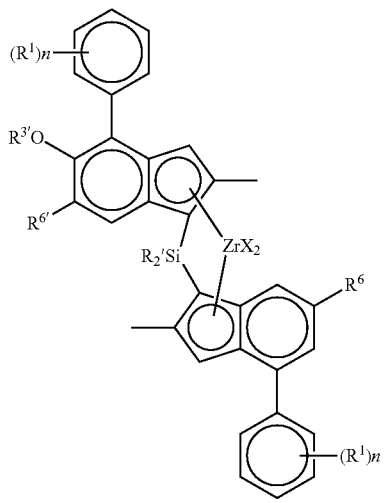

(V')

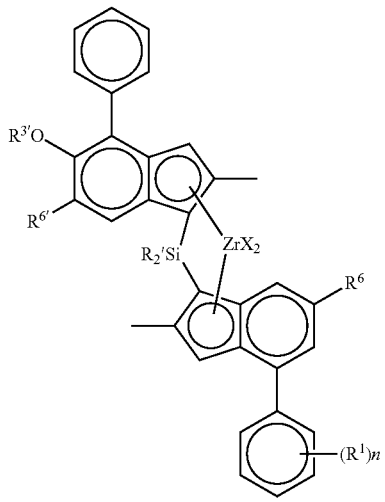

(V)

wherein each X is independently a hydrogen atom, a halogen atom, $C_{1-6}$-alkoxy group, $C_{1-6}$-alkyl, phenyl or benzyl group;

R' is independently a $C_{1-6}$-alkyl or $C_{3-10}$-cycloalkyl;

$R^1$ is independently $C_{3-8}$-alkyl;

$R^6$ is hydrogen or a $C_{3-8}$-alkyl group;

$R^{6'}$ is a $C_{3-8}$-alkyl group or $C_{6-10}$-aryl group, preferably a tertiary $C_{4-8}$-alkyl group;

$R^{3'}$ is a $C_{1-6}$-alkyl group, or $C_{6-10}$-aryl group optionally substituted by one or more halo groups;

and n is independently 0, 1 or 2.

Particular compounds of the invention include:

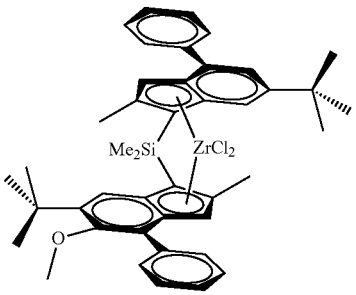

rac-anti-Me$_2$Si(2-Me-4-Ph-6-tBu-Ind)(2-Me-4-Ph-5-OMe-6-tBu-Ind)ZrCl$_2$

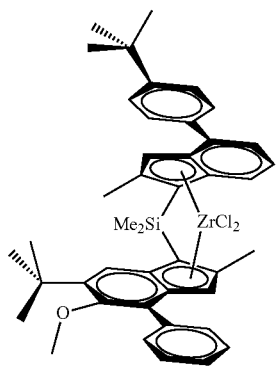

rac-anti-Me$_2$Si(2-Me-4-(p-tBuPh)-Ind)(2-Me-4-Ph-5-OMe-6-tBu-Ind)ZrCl$_2$

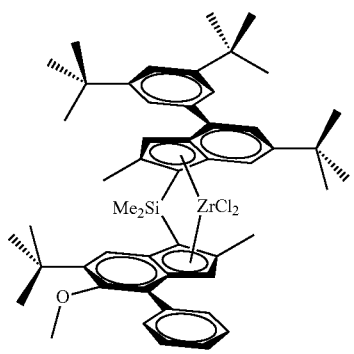

rac-anti-Me$_2$Si(2-Me-4-(3,5-di-tBuPh)-6-tBu-Ind)(2-Me-4-Ph-5-OMe-6-tBu-Ind)ZrCl$_2$

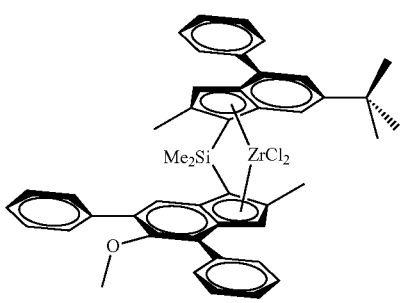
rac-anti-Me$_2$Si(2-Me-4-Ph-6-tBu-Ind)(2-Me-4,6-di-Ph-5-OMe-Ind)ZrCl$_2$
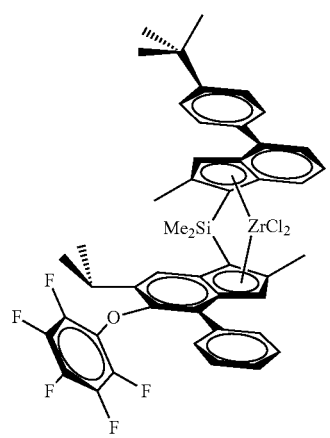
rac-anti-Me$_2$Si(2-Me-4-(p-tBuPh)-Ind)(2-Me-4-Ph-5-OC$_6$F$_5$)-6-iPr-Ind)ZrCl$_2$
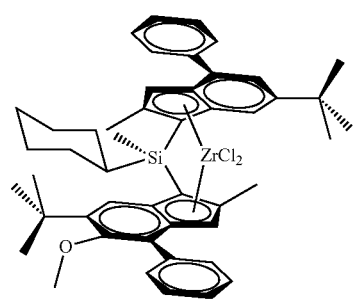
rac-anti-Me(CyHex)Si(2-Me-4-Ph-6-tBu-Ind)(2-Me-4-Ph-5-OMe-6-tBu-Ind)ZrCl$_2$
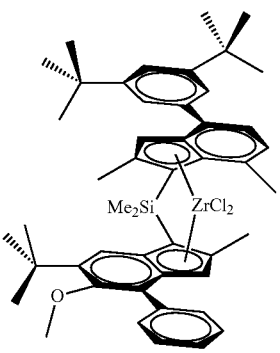
rac-anti-Me$_2$Si(2-Me-4-(3,5-di-tBuPh)-7-Me-Ind)(2-Me-4-Ph-5-OMe-6-tBu-Ind)ZrCl$_2$
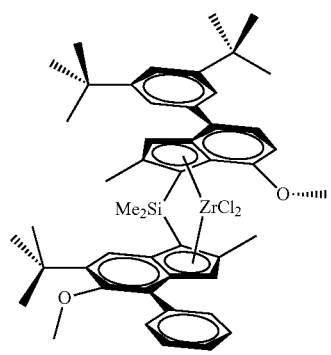
rac-anti-Me$_2$Si(2-Me-4-(3,5-di-tBuPh)-7-OMe-Ind)(2-Me-4-Ph-5-OMe-6-tBu-Ind)ZrCl$_2$
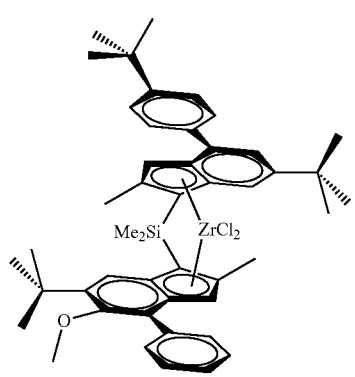
rac-anti-Me$_2$Si(2-Me-4-(p-tBuPh)-6-tBu-Ind)(2-Me-4-Ph-5-OMe-6-tBu-Ind)ZrCl$_2$

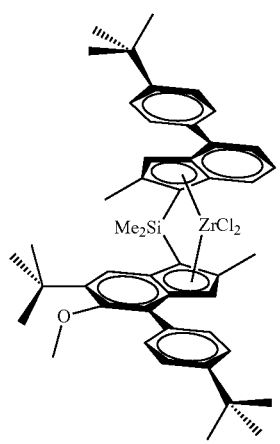

rac-anti-Me$_2$Si(2-Me-4-(p-tBuPh)-Ind)(2-Me-4-(4-tBuPh)-5-OMe-6-tBu-Ind)ZrCl$_2$

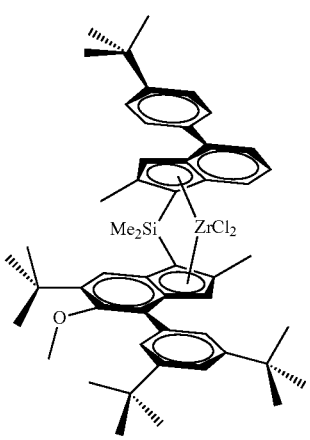

rac-anti-Me$_2$Si(2-Me-4-(p-tBuPh)-Ind)(2-Me-4-(3,5-tBu2Ph)-5-OMe-6-tBu-Ind)ZrCl$_2$

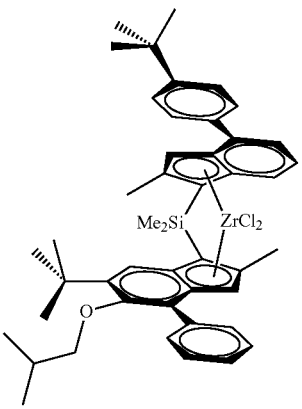

rac-anti-Me$_2$Si(2-Me-4-(p-tBuPh)-Ind)(2-Me-4-Ph-5-OiBu-6-tBu-Ind)ZrCl$_2$

Most preferably rac-anti-Me$_2$Si(2-Me-4-(p-tBuPh)-Ind)(2-Me-4-Ph-5-OMe-6-tBu-Ind)ZrCl$_2$ is used.

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO2002/02576, WO2011/135004, WO2012/084961, WO2012/001052, WO2011/076780, WO2013/007650, WO2015/158790 and WO2018/122134. The examples section also provides the skilled person with sufficient direction.

Cocatalyst

To form an active catalytic species it is normally necessary to employ a cocatalyst as is well known in the art. Cocatalysts comprising one or more compounds of Group 13 metals, like organoaluminum compounds or boron containing cocatalysts or combinations therefrom used to activate metallocene catalysts are suitable for use in this invention.

In a preferred embodiment of the present invention a cocatalyst system comprising a boron containing cocatalyst, e.g. a borate cocatalyst and an aluminoxane cocatalyst is used.

The single-site polymerization catalyst system used in the invention therefore can comprise (i) a complex as defined above and an aluminoxane cocatalyst.

The aluminoxane cocatalyst can be one of formula (II):

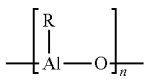

(II)

where n is from 6 to 20 and R has the meaning below.

Aluminoxanes are formed on partial hydrolysis of organoaluminum compounds, for example those of the formula AlR$_3$, AlR$_2$Y and Al$_2$R$_3$Y$_3$ where R can be, for example, $C_1$-$C_{10}$-alkyl, preferably $C_1$-$C_5$-alkyl, or $C_3$-$C_{10}$-cycloalkyl, $C_7$-$C_{12}$-arylalkyl or -alkylaryl and/or phenyl or naphthyl, and where Y can be hydrogen, halogen, preferably chlorine or bromine, or $C_1$-$C_{10}$-alkoxy, preferably methoxy or ethoxy. The resulting oxygen-containing aluminoxanes are not in general pure compounds but mixtures of oligomers of the formula (II).

The preferred aluminoxane is methylaluminoxane (MAO).

Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used.

Boron containing cocatalysts of interest include those of formula (III)

$$BY_3 \qquad (III)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are fluorine, trifluoromethyl, aromatic fluorinated groups such as p-fluorophenyl, 3,5-difluorophenyl, pentafluorophenyl, 3,4,5-trifluorophenyl and 3,5-di(trifluoromethyl)phenyl.

Preferred options are trifluoroborane, tris(4-fluorophenyl) borane, tris(3,5-difluorophenyl)borane, tris(4-fluoromethylphenyl)borane, tris(2,4,6-trifluorophenyl)borane, tris (penta-fluorophenyl)borane, tris(3,5-difluorophenyl)borane and/or tris (3,4,5-trifluorophenyl)borane.

Particular preference is given to tris(pentafluorophenyl) borane.

However it is preferred that as a boron containing cocatalyst borates are used, i.e. compounds containing a borate.

These compounds generally contain an anion of formula:

$$(Z)_4B' \qquad (IV)$$

where Z is an optionally substituted phenyl derivative, said substituent being a halo-$C_{1-6}$-alkyl or halo group. Preferred options are fluoro or trifluoromethyl. Most preferably, the phenyl group is perfluorinated.

Such ionic cocatalysts preferably contain a weakly-coordinating anion such as tetrakis(pentafluorophenyl)borate or tetrakis(3,5-di(trifluoromethyl)phenyl)borate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N,N-dimethylanilinium.

Preferred ionic compounds which can be used according to the present invention include:
tributylammoniumtetra(pentafluorophenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate,
N,N-dimethylaniliniumtetrakis(pentafluorophenyl)borate,
N,N-dimethylcyclohexylammoniumtetrakis(pentafluorophenyl)borate or
N,N-dimethylbenzylammoniumtetrakis(pentafluorophenyl)borate According to the present invention it is especially preferred to use an aluminoxane cocatalyst, like MAO, together with a boron containing cocatalyst, like borate cocatalyst.

Suitable amounts of co-catalyst will be well known to the skilled person.

Preferably, the amount of cocatalyst is chosen to reach below defined molar ratios.

The molar ratio of feed amounts of boron (B) to the metal ion (M) (preferably zirconium) of the metallocene boron/M may be in the range 0.1:1 to 10:1 mol/mol, preferably 0.3:1 to 7:1, especially 0.3:1 to 5:1 mol/mol.

Even more preferably, the molar ratio of feed amounts of boron (B) to metal ion (M) (preferably zirconium) of the metallocene boron/M is from 0.3:1 to 3:1

The molar ratio of Al from the aluminoxane to the metal ion (M) (preferably zirconium) of the metallocene Al/M may be in the range 1:1 to 2000:1 mol/mol, preferably 10:1 to 1000:1, and more preferably 50:1 to 600:1 mol/mol.

Additives

The inventive $C_2C_3$ random copolymer (A) can optionally comprise one or more additives in a total amount of from 0.1 up to 5.0 wt %, based on based on the overall weight of the copolymer (A), selected from the group comprising slip agents, anti-block agents, UV stabilizers, antistatic agents, alpha-nucleating agents and antioxidants.

Such additives are commonly known to an art skilled person.

Slip agents are also commonly known in the art. Slip agents migrate to the surface and act as lubricants polymer to polymer and polymer against metal rollers, giving reduced coefficient of friction (CoF) as a result. Examples are fatty acid amids, like erucamide (CAS No. 112-84-5), oleamide (CAS No. 301-02-0), stearamide (CAS No. 124-26-5) or combinations thereof.

Examples of antioxidants which are commonly used in the art, are sterically hindered phenols (such as CAS No. 6683-19-8, also sold as Irganox 1010 FF™ by BASF), phosphorous based antioxidants (such as CAS No. 31570-04-4, also sold as Hostanox PAR 24 (FF)™ by Clariant, or Irgafos 168 (FF)™ by BASF), sulphur based antioxidants (such as CAS No. 693-36-7, sold as Irganox PS-802 FL™ by BASF), nitrogen-based antioxidants (such as 4,4'-bis(1, 1'-dimethylbenzyl)diphenylamine), or antioxidant blends.

Acid scavengers are also commonly known in the art. Examples are calcium stearates, sodium stearates, zinc stearates, magnesium and zinc oxides, synthetic hydrotalcite (e.g. SHT, CAS No. 11097-59-9), lactates and lactylates, as well as calcium stearate (CAS No. 1592-23-0) and zinc stearate (CAS No. 557-05-1).

Common antiblocking agents are natural silica such as diatomaceous earth (such as CAS No. 60676-86-0 (SuperfFloss™), CAS No. 60676-86-0 (SuperFloss E™), or CAS No. 60676-86-0 (Celite 499™)), synthetic silica (such as CAS No. 7631-86-9, CAS No. 7631-86-9, CAS No. 7631-86-9, CAS No. 7631-86-9, CAS No. 7631-86-9, CAS No. 7631-86-9, CAS No. 112926-00-8, CAS No. 7631-86-9, or CAS No. 7631-86-9), silicates (such as aluminium silicate (Kaolin) CAS No. 1318-74-7, sodium aluminum silicate CAS No. 1344-00-9, calcined kaolin CAS No. 92704-41-1, aluminum silicate CAS No. 1327-36-2, or calcium silicate CAS No. 1344-95-2), synthetic zeolites (such as sodium calcium aluminosilicate hydrate CAS No. 1344-01-0, CAS No. 1344-01-0, or sodium calcium aluminosilicate, hydrate CAS No. 1344-01-0)

Suitable UV-stabilisers are, for example, Bis-(2,2,6,6-tetramethyl-4-piperidyl)-sebacate (CAS No. 52829-07-9, Tinuvin 770); 2-hydroxy-4-n-octoxy-benzophenone (CAS No. 1843-05-6, Chimassorb 81)

Alpha nucleating agents like sodium benzoate (CAS No. 532-32-1); a mixture of aluminium-hydroxy-bis[2,2'-methylene-bis(4,6-di-t-butylphenyl)phosphate] and lithium myristate (commercially available as Adekastab NA-21 of Adeka Palmarole, France) or 1,3:2,4-bis(3,4-dimethylbenzylidene)sorbitol (CAS No. 135861-56-2, commercially available as Millad 3988 of Milliken, USA) can also be added.

Suitable antistatic agents are, for example, glycerol esters (CAS No. 97593-29-8) or ethoxylated amines (CAS No. 71786-60-2 or 61791-31-9) or ethoxylated amides (CAS No. 204-393-1).

Usually these additives are added in quantities of 100-1.000 ppm for each single component. Preferably at least an antioxidant is added.

Article

The present invention is not only related to the composition itself, but also to its use and to articles comprising the inventive $C_2C_3$ random copolymer (A).

The $C_2C_3$ random copolymer composition of this invention can be further converted to an end product, i.e. an article, by using normal conversion techniques, such as injection moulding, compression moulding, blow moulding (extrusion or injection stretch blow moulding), extrusion (film, sheet, pipe, tuber, profile extrusion), film blowing, thermoforming and the like. Preferably, articles are packaging containers made by injection moulding, blow moulding or thermoforming, or packaging films made by film extrusion.

The $C_2C_3$ random copolymer composition of the present invention is therefore suitable for the preparation of a variety of articles, like films (especially blown film) for flexible packaging systems, such as bags or pouches for food and pharmaceutical packaging or medical articles in general as well as moulded articles.

In an embodiment, the present invention is related to an article, the article being an unoriented mono-layer film comprising the inventive $C_2C_3$ random copolymer (A). Accordingly the present invention is also directed to an article, the article being an unoriented mono-layer film, preferably a blown film, e.g. air cooled blown film, comprising at least 80 wt %, preferably comprising at least 85 wt %, yet more preferably comprising at least 90 wt %, of the instant $C_2C_3$ random copolymer (A).

The above described $C_2C_3$ random copolymer (A) is especially suitable for the production of blown films.

Mono-layer films having a thickness of 5 to 300 μm, preferably 10 to 200 μm, more preferably 20 to 150 μm are suitable according to the present invention.

Films, preferably blown films, comprising the inventive $C_2C_3$ random copolymer (A) have beneficial properties (i) to (iv):

(i) The films have a seal initiation temperature (SIT) (determined on 50 μm blown film as described in the experimental part) of below 110° C.

Preferably, the films have a sealing initiation temperature (SIT) in the range of from 80° C. to less than 115° C., more preferably in the range of from 85° C. to less than 112° C., like in the range of from 90° C. to less than 110° C.

It is especially preferred that the difference between melting temperature Tm and SIT, (Tm−SIT), is rather low. Said (Tm−SIT) shall be less than 16° C., like in the range of 5 to 15° C., preferably 8° C. to 15° C.

The low SIT of such a film is combined with (ii) a high hot tack force determined on 50 μm blown film (as described in the experimental part) of above 1.5 up to 5.0 N.

Preferably, the films have a high hot tack force in the range of from 1.8 to 4.5 N, more preferably in the range of from 2.0 to 4.0 N.

The films have (iii) a haze (determined according to ASTM D 1003-00 on 50 μm blown film) of below 10.0%, preferably of below 8.0%, and more preferably of below 6.0%.

Thus, the haze of the films is preferably in the range of from 0.1 to below 10.0%, more preferably in the range of from 0.2 to below 8.0%, and even more preferably in the range of from 0.3 to below 6.0%.

In addition, the films have (iv) a clarity (determined according to ASTM D1003-00 on blown films with a thickness of 50 μm) of at least 80.0% up to 100.0%, preferably of at least 83.0% up to 100.0% and more preferably of at least 85.0% up to 100.0%.

Thus, according to a further embodiment the present invention is also related to blown films comprising the inventive $C_2C_3$ random copolymer (A) and the blown films are characterized by (i) a sealing initiation temperature (SIT) (determined as described in the experimental part) in the range of from 80° C. to below 115° C., (ii) a hot-tack force determined (as described in the experimental part on 50 μm blown film) of above 1.5 up to 5.0 N, (iii) a haze (determined according to ASTM D1003-00 on blown film with a thickness of 50 μm) in the range of from 0.1 to below 10.0% and (iv) a clarity (determined according to ASTM D1003-00 on blown film with a thickness of 50 μm) of at least 80.0% up to 100.0%

Furthermore such films shall preferably have a tensile modulus determined according to ISO 527-3 at 23° C. on blown films with a thickness of 50 μm in machine direction as well as in transverse direction in the range of 300 to 700 MPa, more preferably in the range of 350 to 680 MPa, like in the range of 400 to 660 MPa.

Additionally, it is preferred that the film has a dart-drop impact strength (DDI) determined according to ASTM D1709, method A on a 50 μm blown film of at least 10 g up to 200 g, more preferably in the range of 20 to 150 g, still more preferably in the range of 30 to 100 g, like in the range of 35 to 80 g.

Viewed from another aspect, it is a constant need to provide films, which not only show improvements in one or two of these mechanical or optical properties. So it is desired to provide products with a well-balanced and continuously improved overall performance.

Such an improvement in the overall performance of a blown film can be expressed by the optomechanical ability:

In view of the present invention optomechanical ability (OMA) is understood as the ratio of mechanical (especially dart-drop impact strength (DDI) and tensile (MD)) behaviour, to optical performance, namely haze, wherein the mechanical properties are targeted to be as high as possible and the optical performance in the sense of haze is desired to be as low as possible. The optomechanical ability can be determined by multiplying Tensile Modulus (MD) and dart-drop impact strength (DDI) and putting this product in relation to haze determined on 50 μm blown film.

The optomechanical ability (OMA) is therefore determined according the formula given below:

$$OMA = \frac{\text{Tensile Modulus } (MD)[MPa] * DDI(g)}{\text{Haze } (50 \ \mu m)[\%]}$$

Thus in one further embodiment of the present invention, the optomechanical ability (OMA) of films determined on 50 μm blown film is at least 3000 [MPa*g/%] up to 15000 [MPa*g/%], such as in the range of from 3500 [MPa*g/%] up to 12000 [MPa*g/%], preferably in the range of from 4000 [MPa*g/%] up to 10000.

It is further preferred that the film has a high Elmendorf tear strength as determined in accordance with ISO 6383/2. As measured in machine direction (MD), the tear strength is preferably in the range from at least 3.0 N/mm up to 15.0 N/mm, more preferably in the range of 4.0 up to 12.0 N/mm, like in the range of 5.0 to 10.0 N/mm.

As measured in transverse direction (TD), the tear strength is preferably in the range of from at least 15.0 N/mm up to 40.0 N/mm, more preferably in the range of 17.0 to 35 N/mm, like in the range of 18.0 to 30.0 N/mm.

Thus in a preferred embodiment of the present invention, the films have in addition to parameters (i) to (iv) at least one of the above described parameters selected from DDI, tear strength or OMA, more preferably at least two, like all 3 parameters.

Preferably, the above described films comprise the inventive $C_2C_3$ random copolymer.

A multi-layer film construction comprising at least one layer comprising the inventive $C_2C_3$ random copolymer is preferably produced by multi-layer co-extrusion followed by film casting or preferably by film blowing. In this case, at least one of the outermost layers of said multi-layer film construction serving as sealing layer(s) shall comprise the inventive $C_2C_3$ random copolymer as defined above. The inventive multilayer film construction shall preferably have a thickness in the range of 30 to 500 μm, more preferably in the range of 50 to 400 μm, like in the range of 60 to 300 μm. The sealing layer(s) comprising the inventive $C_2C_3$ random copolymer shall preferably have a thickness in the range of 3 to 50 μm, more preferably in the range of 5 to 30 μm, like in the range of 8 to 25 μm.

Films and/or multi-layer film constructions according to the present invention shall preferably be used for flexible packaging systems, such as bags or pouches for food and pharmaceutical packaging or medical articles in general.

The following definitions of terms and determination methods apply for the above general description of the invention as well as to the below examples unless otherwise defined.

Measuring Methods

Calculation of Comonomer Content of the Second Polymer Fraction (A-2):

$$\frac{C(A) - w(A1) \times C(A1)}{w(A2)} = C(A2) \quad \text{(I)}$$

wherein
w(A-1) is the weight fraction [in wt %] of the first polymer fraction (A-1),
w(A-2) is the weight fraction [in wt %] of second polymer fraction (A-2),
C(A-1) is the comonomer content [in wt %] of the first polymer fraction (A-1),
C(A) is the comonomer content [in wt %] of the $C_2C_3$ random copolymer (A),
C(A-2) is the calculated comonomer content [in wt %] of the second polymer fraction (A-2).

Calculation of Melt Flow Rate $MFR_2$ (230° C.) of the Polymer Fraction (A-2):

$$MFR(A2) = 10^{\left[\frac{\log(MFR(A)) - W(A1) \times \log(MFR(A1))}{W(A2)}\right]} \quad \text{(II)}$$

wherein
w(A1) is the weight fraction [in wt %] of the polymer fraction A-1
w(A2) is the weight fraction [in wt %] of the polymer fraction A-2,
MFR(A1) is the melt flow rate $MFR_2$ (230° C.) [g/10 min] of the polymer fraction A-1,
MFR(A) is the melt flow rate $MFR_2$ (230° C.) [g/10 min] of the $C_2C_3$ random copolymer (A),
MFR(A2) is the calculated melt flow rate $MFR_2$ (230° C.) [g/10 min] of the polymer fraction A-2.

$MFR_2$ (230° C.) is measured according to ISO 1133 (230° C., 2.16 kg load).

Quantification of Microstructure by NMR Spectroscopy

Quantitative nuclear-magnetic resonance (NMR) spectroscopy was further used to quantify the comonomer content and comonomer sequence distribution of the polymers. Quantitative $^{13}C\{^1H\}$ NMR spectra were recorded in the solution-state using a BrukerAdvance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium-(III)-acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatary oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag.

Reson. 187 (2007) 225; Busico, V., Carbonniere, P., Cipullo, R., Pellecchia, R., Severn, J., Talarico, G., Macromol. Rapid Commun. 2007, 28, 1128). A total of 6144 (6 k) transients were acquired per spectra.

Quantitative $^{13}C\{^1H\}$ NMR spectra were processed, integrated and relevant quantitative properties determined from the integrals using proprietary computer programs. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed Cheng, H. N., Macromolecules 17 (1984), 1950).

With characteristic signals corresponding to 2,1 erythro regio defects observed (as described in L. Resconi, L. Cavallo, A. Fait, F. Piemontesi, Chem. Rev. 2000, 100 (4), 1253, in Cheng, H. N., Macromolecules 1984, 17, 1950, and in W-J. Wang and S. Zhu, Macromolecules 2000, 33 1157) the correction for the influence of the regio defects on determined properties was required. Characteristic signals corresponding to other types of regio defects were not observed.

The comonomer fraction was quantified using the method of Wang et. al. (Wang, W-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range of encountered comonomer contents.

For systems where only isolated ethylene in PPEPP sequences was observed the method of Wang et. al. was modified to reduce the influence of non-zero integrals of sites that are known to not be present. This approach reduced the overestimation of ethylene content for such systems and was achieved by reduction of the number of sites used to determine the absolute ethylene content to:

$$E = 0.5(S\beta\beta + S\beta\gamma + S\beta\delta + 0.5(S\alpha\beta + S\alpha\gamma))$$

Through the use of this set of sites the corresponding integral equation becomes:

$$E = 0.5(I_H + I_G + 0.5(I_C + I_D))$$

using the same notation used in the article of Wang et. al. (Wang, W-J., Zhu, S., Macromolecules 33 (2000), 1157). Equations used for absolute propylene content were not modified.

The mole percent comonomer incorporation was calculated from the mole fraction:

$$E = [mol \%] = 100 * fE$$

The weight percent comonomer incorporation was calculated from the mole fraction:

$$E[wt \%] = 100 * (fE * 28.06) / ((fE * 28.06) + ((1 - fE) * 42.08))$$

The comonomer sequence distribution at the triad level was determined using the analysis method of Kakugo et al. (Kakugo, M., Naito, Y., Mizunuma, K., Miyatake, T. Macromolecules 15 (1982) 1150). This method was chosen for its robust nature and integration regions slightly adjusted to increase applicability to a wider range of comonomer contents.

The Xylene Solubles (XCS, Wt %):

Content of xylene cold solubles (XCS) is determined at 25° C. according ISO 16152; 2005

DSC Analysis, Melting Temperature (Tm) and Crystallization Temperature (Tc):

measured with a TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature ($T_c$) and crystallization enthalpy ($H_c$) are determined from the cooling step, while melting temperature ($T_m$) and melting enthalpy ($H_m$) are determined from the second heating step.

Tensile modulus in machine and transverse direction were determined according to ISO 527-3 at 23° C. on cast films of 50 μm thickness produced on a monolayer cast film line with a melt temperature of 220° C. and a chill roll temperature of 20° C. with a thickness of 50 μm produced as indicated below. Testing was performed at a cross head speed of 1 mm/min.

Transparency, haze and clarity were determined according to ASTM D1003-00 on cast films with a thickness of 50 μm produced as indicated below.

Sealing Initiation Temperature (SIT); (Sealing End Temperature (SET), Sealing Range):

The method determines the sealing temperature range (sealing range) of polypropylene films, in particular blown films or cast films. The sealing temperature range is the temperature range, in which the films can be sealed according to conditions given below. The lower limit (heat sealing initiation temperature (SIT)) is the sealing temperature at which a sealing strength of >3 N is achieved. The upper limit (sealing end temperature (SET)) is reached, when the films stick to the sealing device. The sealing range is determined on a J&B Universal Sealing Machine Type 3000 with a film of 50 μm thickness with the following further parameters:

| | |
|---|---|
| Specimen width: | 25.4 mm |
| Seal Pressure: | 0.1 N/mm$^2$ |
| Seal Time: | 0.1 sec |
| Cool time: | 99 sec |
| Peel Speed: | 10 mm/sec |
| Start temperature: | 80° C. |
| End temperature: | 150° C. |
| Increments: | 10° C. |

Specimen is sealed A to A at each sealbar temperature and seal strength (force) is determined at each step. The temperature is determined at which the seal strength reaches 3 N.

Hot Tack Force:

The hot-tack force was determined according to ASTM F1921-12—Method B on a J&B Hot-Tack Tester on a 50 μm thickness film produced on a monolayer cast film line.

All film test specimens were prepared in standard atmospheres for conditioning and testing at 23° C. (±2° C.) and 50% (±10%) relative humidity.

The minimum conditioning time of test specimen in standard atmosphere before start testing is at least 16 h. The minimum storage time between extrusion of film sample and start testing is at least 88 h.

The hot tack measurement determines the strength of heat seals formed in the films, immediately after the seal has been made and before it cools to ambient temperature. The hot-tack measurement was performed under the following conditions:

Film Specimen width: 25.4 mm.

Seal bar length: 50 mm; Seal bar width: 5 mm; Seal bar shape: flat

Seal Pressure: 0.3 N/mm$^2$, Seal Time: 0.5 sec; Cool time: 99 sec; Peel Speed: 200 mm/sec.

Start temperature: 90° C.; End temperature: 140° C.; Increments: 10° C.

The hot tack force was measured as a function of temperature within the temperature range and with temperature increments as indicated above. The number of test specimens were at least 3 specimens per temperature. The output of this method is a hot tack curve; a force vs. temperature curve.

The hot tack force (HTF) is evaluated from the curve as the highest force (maximum peak value) with failure mode "peel".

Dart-drop impact strength (DDI) is measured using ASTM D1709, method A (Alternative Testing Technique) from the film samples. A dart with a 38 mm diameter hemispherical head is dropped from a height of 0.66 m onto a film clamped over a hole. Successive sets of twenty specimens are tested. One weight is used for each set and the weight is increased (or decreased) from set to set by uniform increments. The weight resulting in failure of 50% of the specimens is calculated and reported.

Tear resistance (determined as Elmendorf tear (N)): Applies both for the measurement in machine direction (MD) and transverse direction (TD). The tear strength is measured using the ISO 6383/2 method. The force required to propagate tearing across a film sample is measured using a pendulum device. The pendulum swings under gravity through an arc, tearing the specimen from pre-cut slit. The film sample is fixed on one side by the pendulum and on the other side by a stationary clamp. The tear resistance is the force required to tear the specimen. The relative tear resistance (N/mm) is then calculated by dividing the tear resistance by the thickness of the film.

All film properties (except hexane solubles) were determined on monolayer blown films of 50 μm thickness produced on a Collin blown film line. This line has a screw diameter of 30 millimeters (mm), L/D of 30, a die diameter of 60 mm, a die gap of 1.5 mm and a duo-lip cooling ring. The film samples were produced at 190° C. with an average thickness of 50 μm, with a 2.5 blow-up ratio and an output rate of about 8 kilograms per hour (kg/h).

Hexane Solubles FDA Section 177.1520

1 g of a polymer blown film of 100 μm thickness is added to 400 ml hexane at 50° C. for 2 hours while stirring with a reflux cooler. After 2 hours the mixture is immediately filtered on a filter paper N°41. The precipitate is collected in an aluminium recipient and the residual hexane is evaporated on a steam bath under N2 flow. The amount of hexane solubles is determined by the formula $$((wt.\ sample + wt.\ crucible) - (wt\ crucible))/(wt.\ sample) \cdot 100.$$

Al and Zr Determination (ICP-Method)

In a glovebox, an aliquot of the catalyst (ca. 40 mg) was weighed into glass weighting boat using analytical balance. The sample was then allowed to be exposed to air overnight while being placed in a steel secondary container equipped with an air intake. Then 5 mL of concentrated (65%) nitric acid was used to rinse the content of the boat into the Xpress microwave oven vessel (20 mL). A sample was then subjected to a microwave-assisted digestion using MARS 6 laboratory microwave unit over 35 minutes at 150° C. The digested sample was allowed to cool down for at least 4 h and then was transferred into a glass volumetric glass flask of 100 mL volume. Standard solutions containing 1000 mg/L Y and Rh (0.4 mL) were added. The flask was then filled up with distilled water and shaken well. The solution was filtered through 0.45 μm Nylon syringe filters and then subjected to analysis using Thermo iCAP 6300 ICP-OES and iTEVA software.

The instrument was calibrated for Al, B, Hf, Mg, Ti and Zr using a blank (a solution of 5% HNO$_3$) and six standards of 0.005 mg/L, 0.01 mg/L, 0.1 mg/L, 1 mg/L, 10 mg/L and 100 mg/L of Al, B, Hf, Mg, Ti and Zr in solutions of 5% HNO$_3$ distilled water. However, not every calibration point was used for each wavelength. Each calibration solution contained 4 mg/L of Y and Rh standards. Al 394.401 nm was calibrated using the following calibration points: blank, 0.1 mg/L, 1 mg/L, 10 mg/L and 100 mg/L. Al 167.079 nm was calibrated as Al 394.401 nm excluding 100 mg/L and Zr 339.198 nm using the standards of blank, 0.01 mg/L, 0.1 mg/L, 1 mg/L, 10 mg/L and 100 mg/L. Curvilinear fitting and 1/concentration weighting was used for the calibration curves.

Immediately before analysis the calibration was verified and adjusted (instrument reslope function) using the blank and a 10 mg/L Al, B, Hf, Mg, Ti and Zr standard which had 4 mg/L Y and Rh. A quality control sample (QC: 1 mg/L Al, Au, Be, Hg & Se; 2 mg/L Hf & Zr, 2.5 mg/L As, B, Cd, Co, Cr, Mo, Ni, P, Sb, Sn & V; 4 mg/L Rh & Y; 5 mg/L Ca, K, Mg, Mn, Na & Ti; 10 mg/L Cu, Pb and Zn; 25 mg/L Fe and 37.5 mg/L Ca in a solution of 5% HNO3 in distilled water) was run to confirm the reslope for Al, B, Hf, Mg, Ti and Zr. The QC sample was also run at the end of a scheduled analysis set.

The content for Zr was monitored using Zr 339.198 nm {99} line. The content of aluminium was monitored via the 167.079 nm {502} line, when Al concentration in test portion was under 2 wt % and via the 394.401 nm {85} line for Al concentrations above 2 wt %. Y 371.030 nm {91} was used as internal standard for Zr 339.198 nm and Al 394.401 nm and Y 224.306 nm {450} for Al 167.079 nm.

The reported values were back calculated to the original catalyst sample using the original mass of the catalyst aliquot and the dilution volume.

2. EXAMPLES

The catalyst used in the polymerization processes for the $C_2C_3$ random copolymer of the inventive examples (IE1, IE2) was prepared as follows:

The metallocene (MC1) (rac-anti-dimethylsilandiyl(2-methyl-4-phenyl-5-methoxy-6-tert-butyl-indenyl)(2-methyl-4-(4-tert-butylphenyl)indenyl)zirconium dichloride)

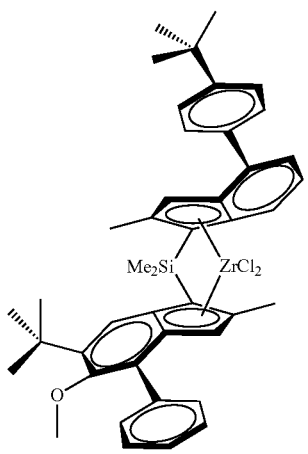

has been synthesized according to the procedure as described in WO2013007650, E2.

Preparation of MAO-Silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (7.4 kg) was added from a feeding drum followed by careful pressuring and depressurizing with nitrogen using manual valves. Then toluene (32 kg) was added. The mixture was stirred for 15 min. Next 30 wt % solution of MAO in toluene (17.5 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The MAO treated support was washed twice with toluene (32 kg) at 90° C., following by settling and filtration. The reactor was cooled off to 60° C. and the solid was washed with heptane (32.2 kg). Finally MAO treated SiO2 was dried at 60° under nitrogen flow for 2 hours and then for 5 hours under vacuum (−0.5 barg) with stirring. MAO treated support was collected as a free-flowing white powder found to contain 12.6% Al by weight.

Catalyst System Preparation for Inventive Example IE1

30 wt % MAO in toluene (2.2 kg) was added into a steel nitrogen blanked reactor via a burette at 20° C. Toluene (7 kg) was then added under stirring. Metallocene MC1 (286 g) was added from a metal cylinder followed by flushing with 1 kg toluene. The mixture was stirred for 60 minutes at 20° C. Trityl tetrakis(pentafluorophenyl) borate (336 g) was then added from a metal cylinder followed by a flush with 1 kg of toluene. The mixture was stirred for 1 h at room temperature. The resulting solution was added to a stirred cake of MAO-silica support prepared as described above over 1 hour. The cake was allowed to stay for 12 hours, followed by drying under N2 flow at 60° C. for 2 h and additionally for 5 h under vacuum (−0.5 barg) under stirring. Dried catalyst was sampled in the form of pink free flowing powder containing 13.9 wt % Al and 0.26 wt % Zr The polymerization for preparing the inventive $C_2C_3$ random copolymer (A) IE1 and IE2 was performed in a Borstar pilot plant with a 2-reactor set-up (loop—gas phase reactor (GPR 1)).

In Table 1 the polymerization conditions for IE1 and IE2 are given.

TABLE 1

|  | IE1 | IE2 |
|---|---|---|
| Prepoly reactor |  |  |
| Temperature [° C.] | 25 | 25 |
| Pressure [Pa] | 5163 | 5157 |
| Residence time [h] | 0.4 | 0.4 |
| loop reactor |  |  |
| Temperature [° C.] | 68 | 68 |
| Pressure [Pa] | 5391 | 5397 |
| Feed H2/C3 ratio [mol/kmol] | 0.29 | 0.30 |
| Feed C2/C3 ratio [mol/kmol] | 48.3 | 48.3 |
| Polymer Split [wt %] | 67 | 74 |
| MFR2 [g/10 min] (MFR of A-1) | 1.7 | 1.5 |
| Total C2 loop [wt %] (C2 of A-1) | 4.0 | 4.8 |
| Residence time | 0.4 | 0.4 |
| GPR1 |  |  |
| Temperature [° C.] | 75 | 75 |
| Pressure [Pa] | 2500 | 2500 |
| H2/C3 ratio [mol/kmol] | 2.8 | 3.0 |
| C2/C3 ratio [mol/kmol] | 222 | 215 |
| Polymer residence time (h) | 1.8 | 1.7 |
| Polymer Split [wt %] | 33 | 26 |
| Total MFR2 [g/10 min] | 1.2 | 1.2 |
| MFR2 [g/10 min] in GPR1 (MFR of A-2) | 0.6 | 0.7 |
| Total C2 [wt %] (loop + GPR1) | 4.7 | 4.6 |
| C2 in GPR1 [wt %] (C2 of A-2) | 6.1 | 5.7 |
| XCS [wt %] | 2.4 | 7.9 |
| Total productivity (kg PP/g cat) | 22 | 20 |

Both polymer powders were compounded in a co-rotating twin-screw extruder Coperion ZSK 57 at 220° C. with 0.2 wt % antiblock agent (synthetic silica; CAS-no. 7631-86-9); 0.1 wt % antioxidant (Irgafos 168FF); 0.1 wt % of a sterical hindered phenol (Irganox 1010FF); 0.02 wt % of Ca-stearat) and 0.02 wt % of a non-lubricating stearate (Synthetic hydrotalcite; CAS-no. 11097-59-9).

TABLE 2

| polymer properties | | |
|---|---|---|
| Pellet | IE1 | IE2 |
| XCS [wt %] | 2.4 | 7.9 |
| Total C2 [wt %] | 4.7 | 4.6 |
| MFR2 [g/10 min] | 1.1 | 1.2 |
| Tm [° C.] | 119 | 118 |
| Tc [° C.] | 80 | 79 |
| Tm-Tc [° C.] | 39 | 39 |

For CE1 the commercial grade RB801CF-01 available from Borealis AG, Austria has been used. RB801CF-01 is an unnucleated propylene-ethylene random copolymer having a melting temperature Tm of 140° C., a crystallization temperature Tc of 91° C., a difference (Tm−Tc) of 49° C., an $MFR_2$ (230° C.) of 1.9 g/10 min, a total C2 content of 4.5 wt % and an XCS content of 8.1 wt %.

In Table 3 film parameters as determined on a 50 μm monolayer blown film produced on a Collin lab-scale blown film line are shown.

TABLE 3

| film parameters | | IE1 | IE2 | CE1 |
|---|---|---|---|---|
| Tensile modulus (MD) | [MPa] | 584 | 629 | 738 |
| Tensile modulus (TD) | [MPa] | 622 | 654 | 709 |
| SIT | [° C.] | 105 | 104 | 122 |
| Tm-SIT | [° C.] | 14 | 14 | 18 |
| Hot-tack force | [N] | 2.12 | 2.40 | 2.16 |
| Haze | [%] | 4.7 | 4.9 | 18 |
| Clarity | [%] | 88 | 98 | 89 |
| C6 solubles, FDA* | [wt %] | 1.16 | 1.23 | 2.6 |
| Relative tear resistance/MD | [N/mm] | 6.4 | 8.5 | 5.7 |
| Relative tear resistance/TD | [N/mm] | 23.3 | 20.3 | 12.9 |
| DDI | [g] | 42 | 56 | 55 |
| OMA | | 5219 | 7263 | 2255 |

*Measured on 100 μm monolayer blown film

From the above table it can be clearly seen that the inventive $C_2C_3$ random copolymers (A) provide blown films, which show an advantageous combination of low sealing initiation temperature (SIT), high hot-tack and good optical properties, like low haze and high clarity. Furthermore such films have low C6 solubles and an improved overall performance, i.e. high OMA.

The invention claimed is:

1. A $C_2C_3$ random copolymer (A) consisting of 50.0 to 85.0 wt % of polymer fraction (A-1) having
   (i) an ethylene content in a range of from 2.0 to 5.2 wt % and
   (ii) a melt flow rate $MFR_2$ (230° C./2.16 kg) measured according to ISO 1133 in a range of from 0.5 to 5.0 g/10 min and 15.0 to 50.0 wt % of polymer fraction (A-2) having
   (i) an ethylene content in a range of from 5.5 to 10.0 wt % and
   (ii) a melt flow rate $MFR_2$ (230° C./2.16 kg) measured according to ISO 1133 in a range of from 0.1 to 3.0 g/10 min,
   wherein the melt flow rate $MFR_2$ (230° C./2.16 kg) of polymer fraction (A-2) is lower than the melt flow rate $MFR_2$ (230° C./2.16 kg) of polymer fraction (A-1), and
   wherein the $C_2C_3$ random copolymer has
   (a) a total ethylene content in a range of from 3.0 to 7.5 wt %;
   (b) a melt flow rate $MFR_2$ (230° C./2.16 kg) measured according to ISO 1133 in a range of from 0.5 to 5.0 g/10 min and
   (c) a melting temperature Tm as determined by DSC according to ISO 11357 of from 110° C. to 135° C.

2. The $C_2C_3$ random copolymer according to claim 1, wherein the $C_2C_3$ random copolymer (A) has an amount of hexane solubles (C6 solubles, FDA) measured on a 100 μm thick blown film according to FDA 177.1520 in a range of from 0.1 to 2.0 wt %.

3. The $C_2C_3$ random copolymer composition according to claim 1, wherein the $C_2C_3$ random copolymer (A) is obtained in the presence of a metallocene catalyst.

4. A process for producing the $C_2C_3$ random copolymer according to claim 1, comprising the following steps
   a) polymerizing in a first reactor (R1) propylene and ethylene, to obtain polymer fraction (A-1) of the $C_2C_3$ random copolymer (A),
   b) transferring said polymer fraction (A-1) and unreacted comonomers of the first reactor (R1) into a second reactor (R2),
   c) feeding to said second reactor (R2) propylene and ethylene,
   d) polymerizing in said second reactor (R2) and in the presence of said polymer fraction (A-1) propylene and ethylene, to obtain polymer fraction (A-2),
   wherein said polymer fraction (A-1) and said polymer fraction (A-2) form the $C_2C_3$ random copolymer (A),
   wherein the polymerizing takes place in the presence of a metallocene catalyst comprising (i) a complex of formula (I):

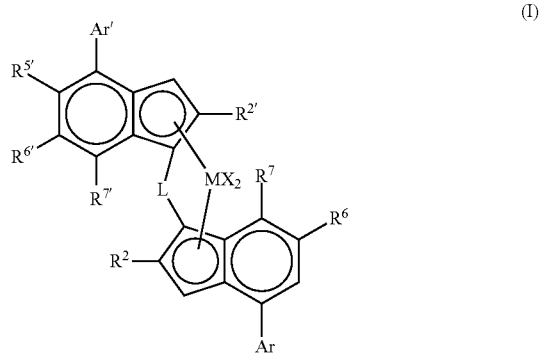

(I)

wherein M is zirconium or hafnium;
each X is a sigma ligand;
L is a divalent bridge selected from —R'$_2$C—, —R'$_2$C—CR'$_2$—, —R'$_2$Si—, —R'$_2$Si—SiR'$_2$—, or —R'$_2$Ge—, wherein each R' is independently a hydrogen atom, $C_1$—$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl;
$R^2$ and $R^{2'}$ are each independently a $C_1$-$C_{20}$-hydrocarbyl radical optionally containing one or more heteroatoms from groups 14-16;
$R^5$, is a $C_1$-$C_{20}$-hydrocarbyl group containing one or more heteroatoms from groups 14-16 optionally substituted by one or more halogen atoms;
$R^6$ and $R^{6'}$ are each independently hydrogen or a $C_{1-20}$-hydrocarbyl group optionally containing one or more heteroatoms from groups 14-16; $R^7$ is hydrogen or $C_{1-20}$-hydrocarbyl group optionally containing one or more heteroatoms from groups 14-14, and $R^{7'}$ is hydrogen;
Ar and Ar' each are independently an aryl or heteroaryl group having up to 20 carbon atoms optionally substituted by one or more groups $R^1$;
each $R^1$ is a $C_{1-20}$-hydrocarbyl group or two $R^1$ groups on adjacent carbon atoms taken together can form a fused 5 or 6 membered non aromatic ring with the Ar or Ar' group, said ring being itself optionally substituted with one or more groups $R^4$; wherein each $R^4$ is a $C_{1-20}$-hydrocarbyl group;
and (ii) a cocatalyst comprising at least one or two compounds of a group 13 metal.

5. The process according to claim 4, wherein as cocatalyst (ii) a cocatalyst system comprising a boron containing cocatalyst and an aluminoxane cocatalyst is used and the catalyst is supported on a silica support.

6. An article, comprising the $C_2C_3$ random copolymer (A) according to claim 1.

7. The article according to claim 6, wherein the article is a blown film.

8. The article according to claim 7, wherein the blown film comprises
   (i) a sealing initiation temperature (SIT) (determined as described in the experimental part) in a range of from 80° C. to below 112° C.,
   (ii) a hot-tack force determined as described in the experimental part on 50 μm blown film) of 1.8 N up to 5.0 N,
   (iii) a haze (determined according to ASTM D1003-00 on blown film with a thickness of 50 μm) in a range of from 0.1 to 8.0%, and
   (iv) a clarity (determined according to ASTM D1003-00 on blown film with a thickness of 50 μm) of at least 80.0% up to 100.0%.

9. The article according to claim 8 having a tensile modulus determined according to ISO 527-3 at 23° C. on blown films with a thickness of 50 μm in machine direction and in transverse direction in a range of 300 to 700 MPa.

10. The article according to claim 8, having a dart-drop impact (DDI) strength determined according to ASTM D1709, method A on a 50 μm blown film of 10 g to 200g.

11. The article according to claim 8 having an optomechanical ability (OMA) determined according to the formula given below:

$$OMA = \frac{\text{Tensile Modulus }(MD)[MPa] * DDI(g)}{\text{Haze }(50\ \mu m)[\%]}$$

of 3000 MPa*g/% to 15000 MPa*g/%.

12. The article according to claim 8 having an Elmendorf tear strength determined in accordance with ISO 6383/2 measured in machine direction (MD) in a range from 4.0 N/mm to 15.0 N/mm, and measured in transverse direction (TD) in a range of from 15.0 N/mm to 40.0 N/mm.

13. A flexible packaging system, selected from bags or pouches for food or pharmaceutical packaging comprising an article according to claim 9.

* * * * *